(12) United States Patent
Larsen et al.

(10) Patent No.: US 7,304,940 B2
(45) Date of Patent: Dec. 4, 2007

(54) NETWORK SWITCH ASSEMBLY, NETWORK SWITCHING DEVICE, AND METHOD

(75) Inventors: Loren D. Larsen, Veradale, WA (US); Daniel K. Melchior, Cheney, WA (US); Steven R. Ramberg, Veradale, WA (US); Jennifer A. Smith, Veradale, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1302 days.

(21) Appl. No.: 10/236,548

(22) Filed: Sep. 5, 2002

(65) Prior Publication Data
US 2004/0047286 A1 Mar. 11, 2004

(51) Int. Cl.
*H04J 3/06* (2006.01)
(52) U.S. Cl. .................. 370/218; 370/235; 370/386
(58) Field of Classification Search ................ 370/216, 370/217, 218, 219, 220
See application file for complete search history.

(56) References Cited

U.S. PATENT DOCUMENTS

| | | | | |
|---|---|---|---|---|
| 5,859,837 A | | 1/1999 | Crayford | 370/230 |
| 6,034,961 A | * | 3/2000 | Masuo et al. | 370/219 |
| 6,148,410 A | * | 11/2000 | Baskey et al. | 714/4 |
| 6,181,675 B1 | * | 1/2001 | Miyamoto | 370/218 |
| 6,529,473 B1 | * | 3/2003 | Bavant et al. | 370/217 |
| 6,757,242 B1 | * | 6/2004 | Wang et al. | 370/216 |
| 6,891,793 B1 | * | 5/2005 | Suzuki et al. | 370/217 |
| 7,023,795 B1 | * | 4/2006 | Hwu | 370/219 |
| 7,155,632 B2 | * | 12/2006 | Vasavada | 714/4 |
| 2002/0009083 A1 | | 1/2002 | Ambe et al. | 370/390 |
| 2002/0010791 A1 | | 1/2002 | Kalkunte et al. | 709/238 |
| 2002/0012346 A1 | | 1/2002 | Kalkunte et al. | 370/389 |
| 2002/0012585 A1 | | 1/2002 | Kalkunte et al. | 415/137 |
| 2002/0018489 A1 | | 2/2002 | Ambe et al. | 370/475 |
| 2002/0023168 A1 | | 2/2002 | Bass et al. | 709/232 |
| 2002/0034181 A1 | | 3/2002 | Kalkunte et al. | 370/392 |
| 2002/0034187 A1 | | 3/2002 | Kalkunte et al. | 370/401 |

* cited by examiner

*Primary Examiner*—Ricky Q. Ngo
*Assistant Examiner*—Dady Chery
(74) *Attorney, Agent, or Firm*—Wells St. John, P.S.

(57) ABSTRACT

A network switch assembly includes a first control entity, a second control entity, and at least one line blade. The first control entity is selectively configurable between an active state and a standby state. The second control entity is selectively configurable between a standby state and an active state. The at least one line blade communicates with at least one of the first control entity and the second control entity and has at least one port configurable to enable switching of information. One of the control entities is configured as an active control entity and another of the control entities is configured as a standby control entity. The active control entity is configured to transfer state information for the active control entity that is forwarded to the standby control entity. A method is also provided for rendering control.

46 Claims, 5 Drawing Sheets

NETWORK SWITCH ASSEMBLY, NETWORK SWITCHING DEVICE, AND METHOD

TECHNICAL FIELD

This invention pertains to switching of packets in packet switched systems. More particularly, this invention relates to a switch assembly having at least two control entities, or control blades, wherein the control blades are alternately configured as an active control blade and a standby control blade, respectively, to enable relatively high speed switchover to the standby control blade when a failure or error condition is detected involving the active control blade.

BACKGROUND OF THE INVENTION

One previously known switching technique provides a device having the ability for a standby control entity to read the configuration of an active control entity and perform a "soft reboot", or software reload and restart, if something happens to the active control entity. Other devices provide for a true hot-standby, where a backup control entity is ready to take over for the active control entity. However, these devices are not operating using dynamic learning or protocols. Rather, they provide statically configured circuits. For example, permanent virtual circuits have previously been implemented in an Asynchronous Transfer Mode (ATM) switching device. Accordingly, an improved switching device and method are needed to enable improved switchover to a new active control entity with a relatively small switchover time.

SUMMARY OF THE INVENTION

A network switch assembly is provided with an active control entity and a passive control entity that are alternately configured as an active control entity and a standby control entity to impart redundancy functionality to a switching device using a synchronization process between the control entities to reduce switchover time and accuracy. In one case, the network switch assembly is an Ethernet switch assembly, and each control entity comprises a control blade.

According to one aspect, a network switch assembly includes a first control entity, a second control entity, and at least one line blade. The first control entity is selectively configurable between an active state and a standby state. The second control entity is selectively configurable between a standby state and an active state. The at least one line blade communicates with at least one of the first control entity and the second control entity and has at least one port configurable to enable switching of information. One of the control entities is configured as an active control entity and another of the control entities is configured as a standby control entity. The active control entity is configured to transfer state information for the active control entity that is forwarded to the standby control entity.

According to another aspect, a network switching device includes a pair of control entities and at least one line blade. The pair of control entities each have processing circuitry. Each control entity is selectively configurable between an active state and a standby state in an alternating manner. More particularly, one control entity is configured in an active state while another control entity is configured in a standby state. The at least one line blade communicates with the first control entity and the second control entity. The at least one line blade has a switching agent and a redundancy agent. The processing circuitry from the first control entity communicates with processing circuitry from the second control entity. One of the control entities is configured as an active control entity and another of the control entities is configured as a standby control entity. Furthermore, one of the processing circuitry is configured to transfer a state of the active control entity to the standby control entity.

According to yet another aspect, a network switching device includes first control means, second control means, and line blade means. The first control means is provided for configuring the switching device and is selectively configurable between an active state and a standby state. The second control means is provided for configuring the switching device and is selectively configurable between a standby state and an active state. The line blade means is provided for enabling switching information between ports and communicating with at least one of the first control entity and the second control entity. One of the first control means and the second control means is configured as an active control entity, another of the first control means and the second control means is configured as a standby control entity, and the active control entity is configured to transfer state information for the active control entity that is forwarded to the standby control entity.

According to even another aspect, a method is provided for rendering control entity redundancy in a network switching device. The method includes: providing a network switching device including a first control entity in an active state, a second control entity in a standby state, and at least one line blade communicating with the first and second control entities and having a plurality of data ports interconnected via switching fabric; detecting an operating state of the active control entity; generating at least one parameter indicative of the detected operating state; and transferring the at least one parameter from the active control entity to the standby control entity.

One advantage provided by the present invention is the ability to bring a standby control entity up to a synchronized state with an active control entity. Another advantage is to maintain the synchronized state on an ongoing basis. A third advantage is to detect failure of the active control blade and transfer control to the standby control blade in a relatively short amount of time. Even another advantage is to provide one or more of the above advantages while also maintaining the ability to determine which of the control blades is active and which of the control blades is on standby.

BRIEF DESCRIPTION OF THE DRAWINGS

Preferred embodiments of the invention are described below with reference to the following accompanying drawings.

FIG. 8 is a process flow diagram showing the process stages for implementing control redundancy in a network switching device by way of the system of FIGS. 1-2.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising a network switch assembly system that uses two control blades such that one control blade is active and another control blade is on standby. While the invention is described by way of a preferred embodiment, it is understood that the description is not intended to limit the invention to such embodiment. Instead it is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

1. Terminology Specific to Network Switching

Blade—As used herein, the term "blade" refers to the components mounted within a chassis of a data switching device, such as an Ethernet switch. Numerous electronic devices are mounted on the blades, within the chassis of the data switching device. Typically, blades are swapped out from the chassis, depending on the particular needs presented by the switching environment in which the data switching device has been placed.

Control blade—The term "control blade" refers to a "blade" that includes a microprocessor and maintains configuration information in a database. The "control blade" also maintains dynamic system information including Layer 2 forwarding databases, protocol state machines, and the operational status of ports within the system. A control blade imparts control functioning and acts as a master relative to a line blade, which acts as a servant.

Line Blade—The term "line blade" as used herein refers to a "blade" that includes data ports, such as Ethernet ports, that are interconnected via a switching fabric in order to enable data traffic to be switched between such ports. In association with a "control blade", the "line blade" takes on the relationship of a servant.

Switching Fabric—As used herein, the term "switching fabric" refers to a combination of hardware and software that moves data coming into a network node out by the correct port (door) to the next node within the network. "Switching fabric" includes switching units, or individual boxes, in a node; integrated circuits contained in the switching units; and programming that allows switching paths to be controlled. The term "switching fabric" is also intended to mean collectively all switching hardware and software in a network. The term appears to use a metaphor for textile weaving in order to suggest the complexity and web-like structure of switching paths and ports within a node. The Signal Computing System Architecture (SCSA) which serves to provide a model framework for computer telephony, uses this term. Within the SCSA framework, a portion of the hardware model includes a Switch Fabric Controller. Asynchronous transfer mode (ATM) and frame relay are sometimes referred to as switching fabric technologies. It is understood that "switching fabric" typically includes data buffers and the use of a shared memory.

2. System Level Overview

Figure 1:
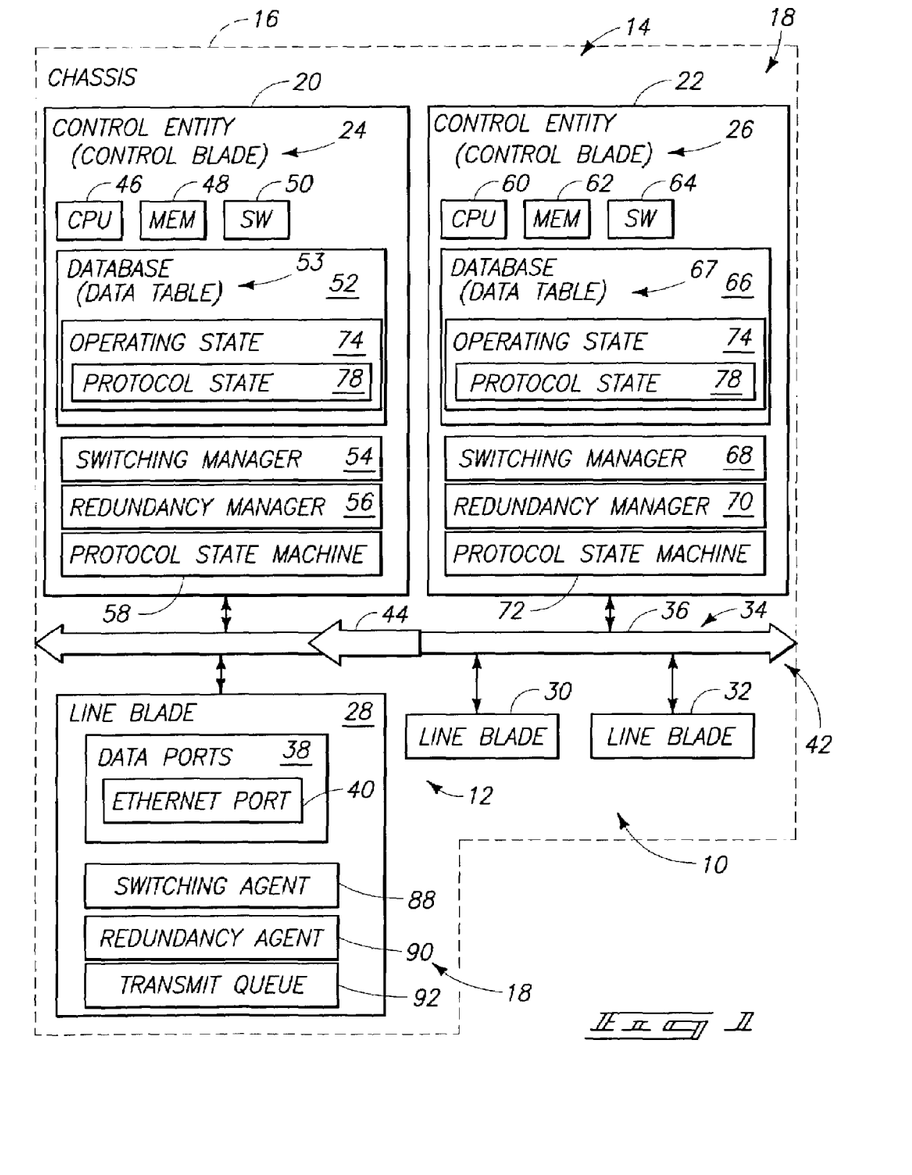
FIG. 1 illustrates a block diagram overview of an exemplary basic system configuration for network switching utilizing redundant control entities, according to one embodiment of the present invention.

FIG. 1 illustrates a network switch assembly system identified by reference numeral 10. By way of one example, network switch assembly comprises an Ethernet data switching device, or Ethernet switch, 12 provided within a network environment 14. Ethernet switch 12 includes a chassis 16 that carries electronic devices 18, including a pair of control entities 20 and 22 that are selectively and alternately configured between an active state and a standby state. More particularly, in one case each control entity 20 and 22 comprises a control blade 24 and 26, respectively. Additionally, switch 12 includes a number of line blades, such as line blades 28, 30 and 32 that are coupled together with control blades 24 and 26 via a communication medium 34, such as a high speed bus in the form of a back plane 36.

Line blades 28, 30 and 32 each include a plurality of data ports 38, such as Ethernet ports 40. Although they have been simplified for the drawing, line blades 30 and 32 include the internal elements shown in line blade 28. Ports 38 are interconnected with a switching fabric 42 in a manner that enables data traffic 44 to be switched between ports 38 in a desired manner.

According to FIG. 1, control blade 24 includes a central processing unit (CPU) 46, memory 48, control software (SW) 50, a database 52, a switching manager 54, a redundancy manager 56 and a protocol state machine 58. Likewise, control blade 26 includes a CPU 60, memory 62, control software (SW) 64, a database 66, a switching manager 68, a redundancy manager 70, and a protocol state machine 72.

Databases 52 and 66 are configured to record the operating state 74 of control entity 20, when control entity 20 is the active control entity. Likewise, databases 52 and 66 each record the operating state 74 of control entity 22, when control entity 22 is the active control entity. Control entities 20 and 22 also include the protocol state 78 of the active control entities 20 and 22 within operating state 74. Protocol state 78 is derived from protocol state machines 58 and 72, respectively.

More particularly, CPUs 46 and 60 each comprise a microprocessor. Databases 52 and 66 are used to maintain configuration information, as well as maintain dynamic system information, such as Layer 2 forwarding databases, protocol state machines, and the operational state (or status) of ports 38 in system 10. It is understood that multiple protocols are typically operating, with each protocol having one or more state machines associated with the respective protocol.

System 10 uses two control entities 20, 22 (or control blades 24, 26) in a manner that maintains one control blade as an active control blade and the other control blade as a standby control blade. If a failure is detected on the active control blade, the standby control blade is used to assume operating responsibilities from the active control blade, thereby becoming the new active control blade and taking over management of system 10. The old active control blade then becomes the new standby control blade, assuming that it is still operating. The preceding assumes that the failure that initiated this process was a failure of the active control blade. It is desirable to maintain as small a time as possible between any failure of the active control blade and switchover of control to the standby control blade, making it the new active control blade.

According to system 10 of FIG. 1, there are two main aspects that contribute to realizing a desired, relatively small switchover time. First, a particular mechanism is used by system 10 to synchronize the state of the control blades 24, 26 and keep the states synchronized over time. Secondly, system 10 uses a particular mechanism for detecting a failure and maintaining synchronization.

Upon start-up of system 10, one of control blades 24 and 26 is designated as the active control blade. For example, upon start-up, control blade 24 can be designated as the active control blade. If there is another control blade at the time of start-up, the other control blade is designated as the standby control blade (control blade 26, in the example). However, for the case where the other control blade is inserted into system 10 following power-up of system 10, it is designated as the standby control blade in response to inserting the other control blade.

Once a control blade has been designated as a standby control blade, the control blade needs to be synchronized with the active control blade using a particular synchronization process described below in greater detail. The synchronization process requires that the state on the active control blade be transferred to the standby control blade. The state is typically kept in a database, in an appropriate database format. The synchronization process transfers the contents of the database from the active control entity to the standby control entity. For example, for the case where control blade 24 is active and control blade 26 is in a standby mode, contents of database 52 are transferred to database 66. Any state that is present outside of the database is transferred via messages within system 10.

When synchronizing, one important factor is the ability to queue the inputs to the active control blade, transfer the state, and then process the inputs that were previously queued, all without losing information even though queuing of the inputs causes a state change. Once the control blades have been synchronized with the same state, if the processors on both control blades have identical hardware configurations and run identical versions of software, then identical inputs will produce identical states in such control blades.

State changes on a control blade 24 can be provided by two sources. First, state changes can be generated by an internal protocol operation. Secondly, state changes can be generated as inputs from the line blade 28. The inputs may consist of management commands, such as in the form of Command Line Interface (CLI) commands that are generated over a telnet session, or via a management protocol, such as via Simple Network Management Protocol (SNMP), as well as via protocol control packets.

In the first case, if the protocols are synchronized, using the protocol given in the above example, and they receive substantially identical input, then they should remain synchronized. In the second case, if the management commands and control protocol packets are processed substantially identically on the processors running substantially identical code with substantially identical configuration, then they should also produce an identical state change on each processor. As used herein, the term "substantially identical" refers to sufficiently identical to produce identical responses to line blades based on equivalent inputs.

For purposes of understanding the design layout, network switch assembly 10 of FIG. 1 has been described in general terms with respect to the manner in which redundancy management is carried out for control entities 20 and 22. However, it is understood that multiple unique product configurations (or models) are possible for network switch assembly 10. Such multiple unique product configurations result in multiple unique switching products, each optimized for a specific set of operating parameters and requirements. Accordingly, five unique product configurations will be described in greater detail below for realizing control blade redundancy. Techniques for synchronizing control blades will also be described.

3. Control Blade Redundancy

With respect to redundancy functionality in network switching products that take on the configuration of network switch assembly 10 of FIG. 1, it is understood that not all products will support all of the redundancy features that will be described below.

Control blade redundancy is realized using five unique product configurations that result in five models of redundancy. Control blade redundancy requires that control blades, or control entities, back each other up with an identical configuration. Accordingly, if one module, containing a control blade, fails or becomes unhealthy, the standby module, containing the other control blade, becomes active and traffic switches to the ports of the new active module. In order to ensure smooth operation, it is desirable for the switchover time to be less than 500 milliseconds, according to one implementation.

There are five models of redundancy that are used as a basis for the present switching redundancy architecture: a Passive-Backup Model; an Active-Protected Model; a Distributed State Model; a Hybrid Model; and a Modified Active-Protected Model. Each model has advantages and disadvantages that make utilization of one model more suitable than the others for a particular set of operating conditions and system environment.

For purposes of this disclosure, a system is said to be in Protected Mode if the standby control is in such a state that, if the active control blade were to fail, it could become the active control blade without incurring a loss of system state.

3.1 Passive-Backup Model

Figure 2:
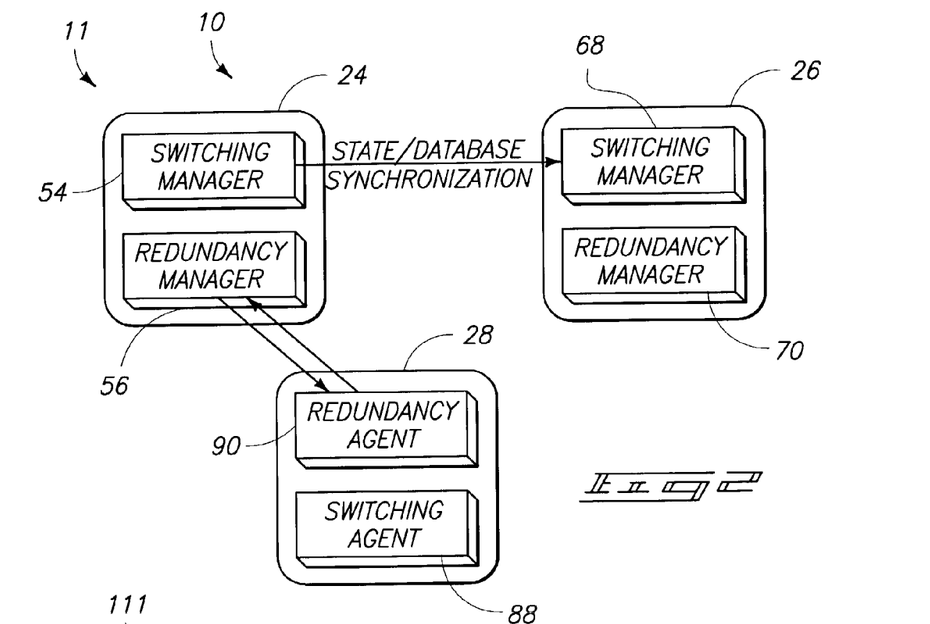
FIG. 2 illustrates a passive backup redundancy model implementation for the system of FIG. 1.

FIG. 1 illustrates the Passive-Backup Model 11 of redundancy implemented via the network switch assembly 10 (of FIG. 1). According to the Passive-Backup Model 11, redundancy agent 90 from each line blade 28 communicates only with active control blade 24. Active control blade 24 is responsible for maintaining the state of standby control blade 26. Control blades 24 and 26 each include switching managers 54 and 68 and redundancy managers 56 and 70, respectively. Line blade 28 includes a redundancy agent 90 and a switching agent 88.

There are several techniques used to realize this communication arrangement. However, the general approach is common in that the active control blade 24 sends an updated state or updated database periodically to the standby control blade 26.

However, there are several problems with using the Passive-Backup Model over other alternative models described herein. First, implementation of this model adds additional burden on the active control blade as the active control blade is required to constantly send state updates to the standby control blade. This could negatively impact overall performance. For instance, this could adversely affect the ability of the system to handle Internet Group Management Protocol (IGMP) channel changes. Since the database is already overburdened and is considered a point of congestion (or choke point), requiring it to further duplicate each signal and send it to the standby control blade may increase restriction of the choke point even further.

Secondly, there is a need to reconcile line blade state with control blade state. All changes on the active control blade are sent to the standby control blade. Therefore, if the active control blade fails and has several signals on its queue, then the standby control blade will be out of synchronization with the line blades. There is no ability to verify line blade state with control blade state.

There are several identified advantages to using the Passive-Backup Model over other alternative models described herein. First, it provides a reduced complexity approach, relative to the other approaches. Secondly, it provides a relatively fast switchover time, ignoring any lost active signals and requirements to correct out of synchronization line blades.

3.2 Active-Protected Model

Figure 3:
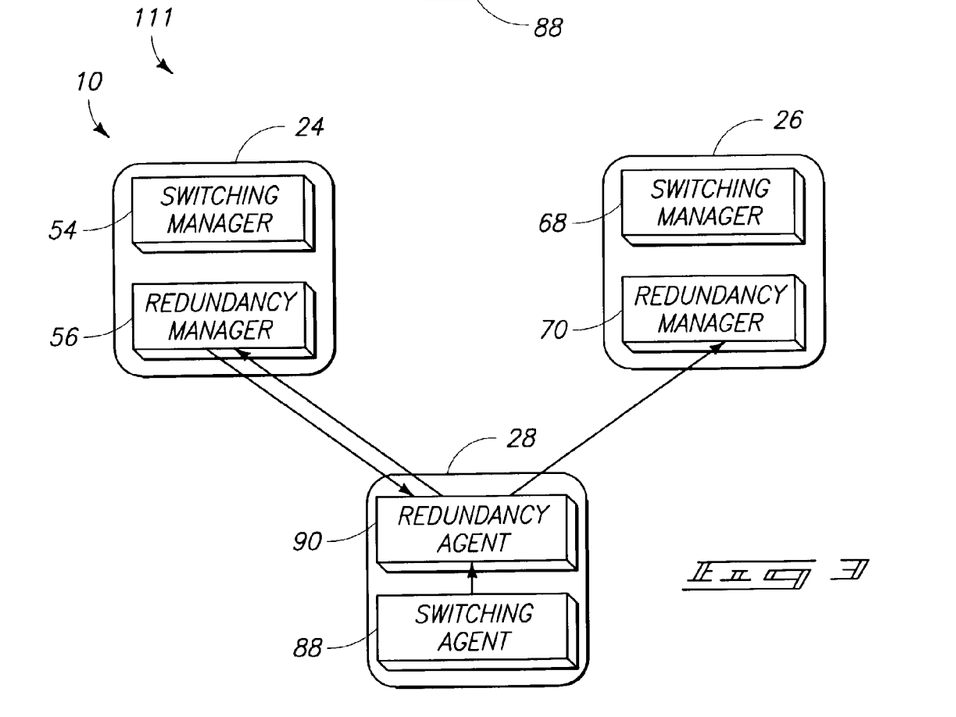
FIG. 3 illustrates an active-protected redundancy model implementation for the system of FIG. 1.

FIG. 3 illustrates an Active-Protected Model 111 of redundancy for the network switch assembly 10 (of FIG. 1). The Active-Protected Model 111 assumes that the standby control blade 26 maintains the exact state of the active control blade 24 at all times. Therefore, if the active control blade 24 fails, the standby control blade 26 can take over without requiring state synchronization.

There are several ways to implement the Active-Protected Model 111 of redundancy for control blades. The general approach taken for the present switching design assumes that the state of a redundancy agent 90 is totally predictable by observing the messages sent to it by redundancy manager 56. And likewise the states of the redundancy managers 56 and 70 are totally predicable as long as the same messages are received in the same order from redundancy agents 90. This is true for an initial synchronization or a simultaneous boot using the same initial configuration. For example, the spanning tree port state of any given port can always be determined by observing the message sent to the port by the port's manager. This means that by merely replicating messages sent from redundancy agent 90 to managers 56 and 70 on an active control blade 24 and a standby control blade 26, respectively, the manager states will be the same and the agent states will be known by both managers 56 and 70.

More particularly, FIG. 3 illustrates a setup with two control blades 24 and 26 talking to a single line blade 28. The managers 56 and 70 on both the active and standby control blades 24 and 26 receive the same signals from the agent 90 (and agent 88) and process the signals in the same way. Redundancy agent 90 duplicates all signals destined for the active control blade 24 and sends them to the standby control blade 26.

However, any signals from the redundancy manager 56 only come from the active control blade 24. The redundancy manager 70 of the standby control blade 26 drops all messages to the redundancy agent 90 since this message would be a duplicate of what the active control blade 24 has already sent to line blade 28.

If control blades 24 and 26 are not booted together, then some method is required to initially synchronize the control blades. The Passive-Backup Model (of FIG. 2) can be implemented and used in order to provide an initial synchronization between the control blades 24 and 26 where they are not booted together.

There exist several disadvantages to using the Active-Protected Model. First, the Active-Protected Model requires the use of another synchronization method for initialization. For example, it may require use of the synchronization method used in the Passive-Backup Model. When control blades are not booted together, it is necessary to use the Passive-Backup Model synchronization mechanism to synchronize the control blades initially. Each time the control blade drops out of protected mode, then it must stop all control blade/line blade traffic, resynchronize and then resume.

Secondly, the Active-Protected Model uses a relatively less complicated design and one over which there is not a lot of control, nor is there an ability to correct if there are problems.

Thirdly, the Active-Protected Model assumes that the state of the system is deterministic based on the receipt of signals. That is, the signals coming in from the agents must be received in the same order by both control blades. This is the key to the model's success. However, there are several scenarios in which this will not occur. The most obvious scenario occurs with inputs from the local port on the control blade. Clearly, although these signals can be replicated and sent to the standby control blade, there are situations in which they will not be received in the same order. Additionally, the loading on each control blade is not the same, so that processing of the signals may be different for each blade which may lead to non-deterministic behavior.

Fourth, the Active-Protected Model also requires that the system be able to synchronize itself while running. There are many cases in which the system could fall out of protected mode. For instance, if a line blade loses a link with only one of the control blades, the system is no longer protected since signals are only going to one control blade. Thus, the active control blade is required to now run in a non-protected synchronizing mode until the link is re-established. Once it is re-established, then the system can re-synchronize and go back into protected mode, as discussed previously.

Fifth, with the Active-Protected Model, during a switchover, it is possible for the managers and agents to become out of synchronization due to the loss of signals. There are a couple of situations in which this could occur. However, the situation during a failure of the active control blade is most recognizable. In this scenario, the active control blade has failed. However, there are several signal messages still on the active control blade's queue that need to be sent. Obviously, they are lost on the active control blade. However, the standby blade will continue to dump its signals until it has detected a failure. Since detection does not happen immediately, the potential for lost signal responses from the managers is not insignificant. As a result of such an occurrence, the managers on the standby blade will be out of synchronization with the line blades once the standby control blade becomes the new active control blade.

Sixth, with the Active-Protected Model, a loss of signals between a line blade and a control blade can cause a loss of synchronization between the active and standby control blades. Use of a reliable transport mechanism can guarantee the signal delivery. However, this can introduce errors. For instance, assume two line blades send signals to both control blades. If one signal needs to be retransmitted, then it is possible that the control blades will receive the signals in a reverse order, thus causing a synchronization problem.

Seventh, with the Active-Protected Model, several managers are state machines driven by timers. These timers cannot be synchronized between control blades. Therefore, for example, the state of IEEE 802.1W Rapid Spanning Tree Protocol (RSTP) will never be the same on both control blades. The impact on state synchronization is not really known.

Eighth, with the Active-Protected Model, it is presently believed to be impossible to verify that the states are synchronized unless all traffic to the control blades is stopped.

Ninth, with the Active-Protected Model, there is no mechanism to verify that the line blade states are in synchronization with the control blades. Furthermore, there is no mechanism to clean up entries.

Tenth, with the Active-Protected Model, memory leaks will typically be reflected on both the active and standby control blades since they are running in parallel. Therefore, this approach does not protect against software failures that manifest as memory leaks.

There exist several advantages to using the Active-Protected Model. First, the Active-Protected Model has the fastest switchover time of the models described herein, ignoring any time required to synchronize line blades due to signals lost on the active control blade.

Secondly, the Active-Protected Model places minimal loading on the active control blade due to redundancy.

There exist other considerations with an Active-Protected Model. Namely, the procedure for a software upgrade occurs as follows: (i) Drop out of protected mode; (ii) upgrade the standby control blade software and allow it to reboot; (iii) resynchronize the active and standby control blades; (iv) switch over to the standby control blade; (v) upgrade the other former active control blade and reboot it; and (vi) synchronize the control blades and allow the old standby control blade to remain the active control blade and go into protected mode.

The problem with the above-described approach lies in procedure (iii), above, because it requires use of different versions of control blade software to synchronize the active and standby control blades. In some cases, it may not be possible to synchronize between the two different versions of software. Although this can be incorporated as a requirement for any software upgrades, the only requirement is that the control blade software should be compatible with the current line blade software. Accordingly, different software versions should be able to synchronize themselves. In this case, synchronization does not necessarily mean being able to run in parallel.

3.3 Distributed State Model

Figure 4:
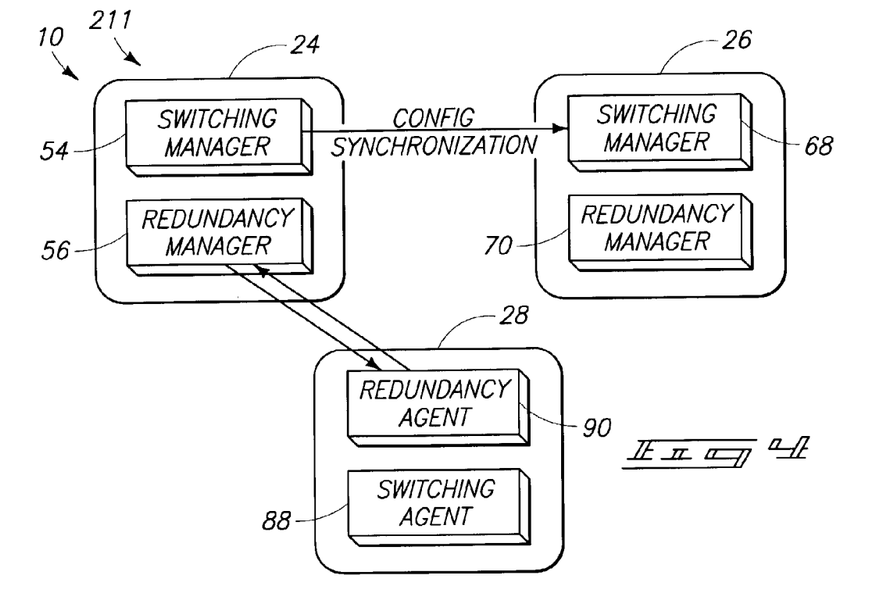
FIG. 4 illustrates a distributed state redundancy model implementation for the system of FIG. 1.

FIG. 4 illustrates a Distributed State Model 211 of redundancy for the network switch assembly 10 of FIG. 1. The Distributed State Redundancy Model assumes that the manager state can be re-created by the state stored on each of the line blades 28. In this model, the line blades 28 send signals only to the active control blade 24. The standby control blade 26 is running in a standby mode in which it will update configuration changes, but will not act upon them.

If the active control blade 24 fails, the standby control blade 26 takes over. On loss of connection to the active control blade 24, the redundancy agent 90 on each of the line blades will queue any incoming signals. Once the standby control blade 26 has become active, the switching manager 68 on the standby control blade 26 will send a synchronization request to the line blades 28. Each of the redundancy agents 90 will then send their state data via a special Application Program Interface (API) since the redundancy agents 90 are queuing all regular traffic.

Each switching manager 54 and 68 is responsible for being able to recreate its database given information from its agent. Each switching manager 54 and 68 can do so independent of the order in which information is received. In most cases, this will mean that each redundancy agent 90 has a subset of the manager database table (tables 53 and 67 of FIG. 1). When a resynchronization is required, the redundancy agent 90 will send the switching manager 54 or 68 its table entries and the switching manager 54 or 68 will consolidate them into its table.

Once the synchronization is complete, the redundancy manager 56 or 70 tells the redundancy agent 88 to start sending signals.

In the case of configuration changes, it is required that the active control blade configuration be synchronized with that of the standby control blade. Thus, the active and standby control blades still perform some background synchronization for user configuration changes.

There exist several disadvantages to using the Distributed State Redundancy Model. First, agent design is impacted greatly as agents are now required to store their state. In addition, the managers may need to transfer down unnecessary data that needs to be stored by the line blades. It also may require that the agents use the database that they do not currently use. It may also mean that drivers may need to be modified to provide state information (i.e., get cmds).

Secondly, for large tables the synchronization process could be slow. As a result, a desired failover time could be adversely affected. A detection and switchover can occur in that time. However, it may take several seconds after that to completely regenerate the state. In this amount of time, packets will continue to be switched through the switching fabric, although no new packet processing can be done by the control entity.

There exist several advantages to using the Distributed State Redundancy Model. First, it is able to re-create manager state at any time. Thus, it is not impacted by loss of signals on the active control blade.

Secondly, there is minimal additional loading on the active control blade due to redundancy.

Thirdly, it is robust. A manager can synchronize at any time and has more knowledge of the actual state of the agent.

Fourth, managers/protocols without agents cannot be synchronized by the line blades and thus need to be restarted on the standby blade when it becomes active.

Fifth, it may not meet switchover criteria since there is a considerable amount of data to synchronize from the line blades.

3.4 Hybrid Model

Figure 5:
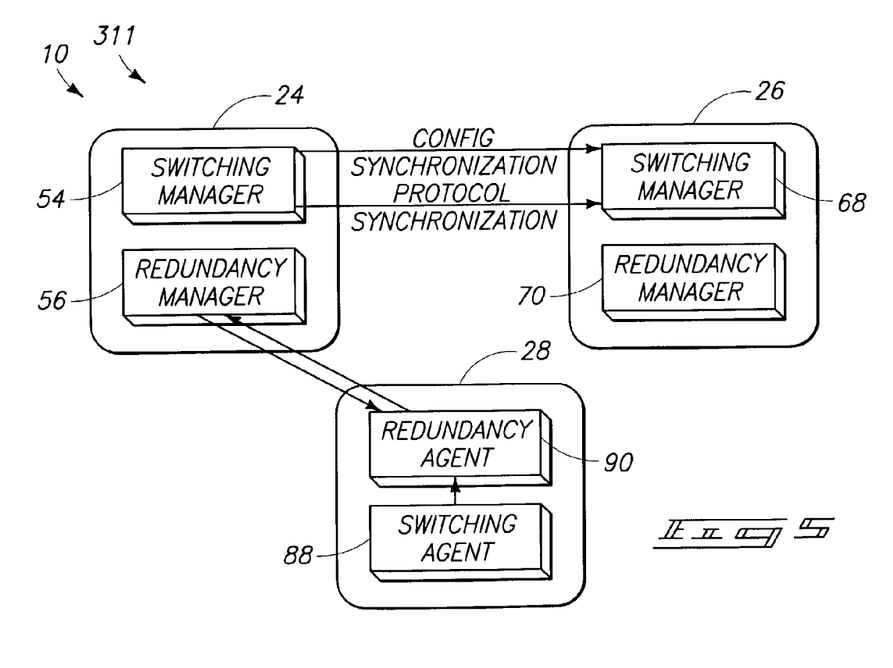
FIG. 5 illustrates a hybrid redundancy model implementation for the system of FIG. 1.

FIG. 5 illustrates the Hybrid Model 311 of redundancy for the network switch assembly 10 of FIG. 1. The Hybrid Model 311 is a merging of selected design features from the Passive-Backup and Distributed State Models that combine to overcome the deficiencies individually in each of these models. The major problem with the Distributed State Model is that protocols running only on the managers cannot be synchronized. The problem with the Passive-Backup Model is that there is a window during failover in which signals are dropped which can cause managers to be out of synchronization with the line blades.

More particularly, the Hybrid Model 311 provides for configuration synchronization and protocol synchronization of the switching managers 68 of the standby control blade 26 from the switching managers 54 of the active control blade 24. The redundancy agent 90 of an active line blade 28 communicates bi-directionally with the redundancy manager 56 of the active control blade 24.

The Hybrid Model 311 makes the following assumptions when trying to correct for these deficiencies:

First, protocols are less susceptible to loss of signal synchronization information and can recover over time without the need of information from the line blades 28.

Secondly, the managers 54, 56 need to synchronize with the line blades 28. There will be cases outside of redundancy that this may be needed.

There exist several advantages to using the Hybrid Model. First, it allows the managers to synchronize from the state on the line blades. Thus, no state information is lost.

Secondly, it allows the protocols to synchronize their state to an acceptable level from which they can recover after a switchover.

There exist several disadvantages to using the Hybrid Model. First, it is a relatively complicated implementation. More particularly, it requires that the agents keep the state of managers. It also generally requires that a manager on one control blade knows about and can communicate with its redundant-self on the standby control blade. However, this greatly complicates the design.

Secondly, it may not be able to meet the desired control blade switchover criteria. In one implementation, the desired control blade switchover criteria was a time limit of 0.5 seconds. This is due to the fact that there is a considerable amount of data from the line blades that needs to be synchronized by the manager.

3.5 Modified Active-Protected Model

Figure 6:
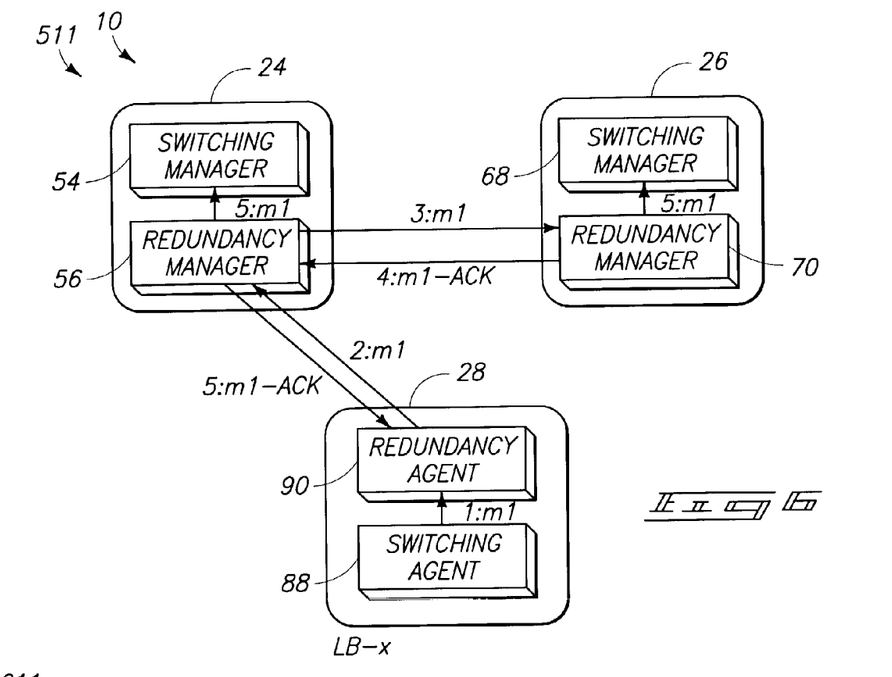
FIG. 6 illustrates a modified active-protected redundancy model implementation for the system of FIG. 1.

FIG. 6 illustrates the Modified Active-Protected Model for the network switch assembly of FIG. 1. The Active-Protected Model (of FIG. 3) can be extended in fairly simple ways to achieve this modification which solves most of the disadvantages that were previously discussed. First, the approach will be described. Then, the manner in which it solves each of the problems will be illustrated.

First, a switching agent 88 sends a message m1 to a redundancy agent 90 within a line blade 28 for transmission to a control blade 24.

Secondly, the redundancy agent 90 forwards message m1 to the control blade 24 that appears to be active at the time.

Thirdly, when message m1 is received from the redundancy agent 90 on line blade (LBx) 28, it is forwarded to the redundancy manager 70 on the standby control blade 26.

Fourth, when the redundancy manager 70 on the standby control blade 26 receives the message it is forwarded towards the switching manager 68 on standby control blade 26. Additionally, an acknowledgment (m1-ACK) message is sent back to the redundancy manager 56 on the active control blade 24.

Fifth, when the redundancy manager 56 on the active control blade 24 receives the acknowledgment message (m1-ACK), it is forwarded to the correct manager 54 on the active control blade 24 and the acknowledgment message (m1-ACK) is forwarded back to the line blade 28 (LBx). When the redundancy agent 90 on line blade 28 receives this acknowledgment message (ACK), the redundancy agent removes the message from its transmit queue. This allows another message to be sent up to the control blades 24 and 26.

There appear to be four cases where failure can occur in the Modified Active-Protected Model above.

CASE 1:
m1: $LB_X > CB_A$
m1: $CB_A > CB_S$
m1:-ACK: $CB_S > CB_A$
m1:-ACK: $CB_A > LB_X$
$CB_A$ fails here
CASE 2:
m1: $LB_X > CB_A$
m1: $CB_A > C_S$
m1:-ACK: $CB_S > CB_A$
$CB_A$ fails here
CASE 3:
m1: $LB_X > CB_A$
m1: $CB_A > C_S$
$CB_A$ fails here
CASE 4:
m1: $LB_X > CB_A$
$CB_A$ fails here Case 1 will guarantee that the messages will arrive at both the active control blade and the standby control blade. A following description will discuss how to guarantee that the "reply" messages will be returned to the correct line blade.

Cases 2, 3, and 4 are the same in the sense that the acknowledgment message (m1-ACK), corresponding to message m1, does not make it back to the line blade 28 ($LB_X$), meaning that it will re-transmit after a timeout period. There is a possibility in Case 2 and Case 3 that a request will be received by the control blade multiple times.

For the cases above, central processing unit (CPU) egress issues become a concern. When state is communicated from a line blade to a control blade and that communication produces state changes at the control blade that must then be sent back down to the line blade, there needs to be a way for the control blade to know that its message was received at the line blade.

Using Modified Active-Protected Model 511 when an active control blade fails, there is a period of time required for the system to detect the failure, δ. When the standby control blade becomes active, the system does not know which actions required by a line blade were completed prior to the failure, and which were never completed. Those operations that were not completed by the active control blade need to be properly completed by the standby control blade in order for the system to operate correctly.

A first solution involves sending an acknowledgment (ACK) to everything that goes down to the line blade 28. The problem is then removed. However, there is a risk of losing acknowledgments (ACKs).

A second solution involves having the redundancy manager 70 on the standby control blade 26 not drop the messages being sent down. Essentially, a concept called a throwaway window is used. The throwaway window is sized by time of a size δ. This δ value may be difficult to correctly size, a priori. One exemplary value for δ that is achievable is 500 milliseconds. However, for some cases, this could be quite large. On the other hand, in combination with all the acknowledgments being transmitted, it might be relatively small. Essentially, there is a queue in the software large enough to contain the maximum number of messages that can be sent within the throwaway window. Once a message is older than the value, then it is discarded. If a failover occurs, then the standby control blade just sends all the messages that are queued up in the throwaway candidate queue.

The above-described scheme appears functional. However, it appears to suffer from a problem in that a given message may arrive at a line blade multiple times. The above-described scheme can be extended as shown below with reference to FIG. 7.

Figure 7:
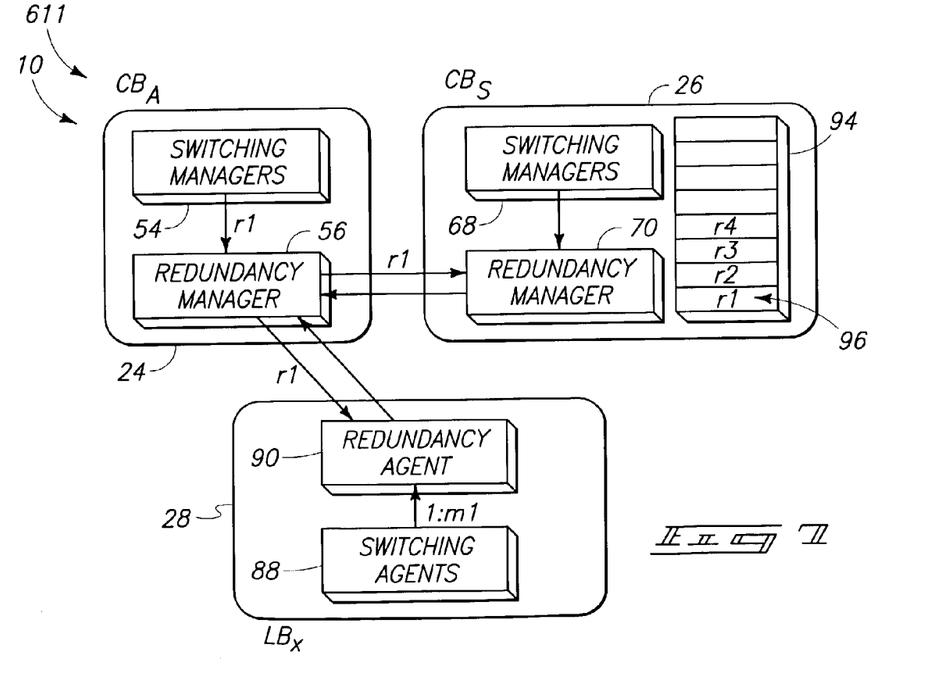
FIG. 7 illustrates a standby signal queue for the modified active-protected redundancy model of FIG. 6.

FIG. 7 illustrates a Modified Active-Protected Model With Standby Signal Queue 611 for the network switch assembly 10 of FIG. 1. Essentially, when the active control blade 24 sends its reply message down it also sends it to the standby control blade 26. The standby control blade 26 also replies in the same order. This assumes that the control blades 24 and 26 are processing messages in the same sequence. When the standby control blade 26 gets the reply message, it compares the message with the entry 96 at the head of the queue 94. If the message and the entry 96 match, then the message is de-queued with the assumption that this message has also arrived at the line blade 28.

Following is a description of how the Modified Active-Protected Model 611 with Standby Signal Queue of FIG. 7 solves the disadvantages previously described for the Active-Protected Model.

The first identified disadvantage for the Active-Protected Model was the required use of another synchronization method for initialization. However, all approaches (or models) require some scheme to initially get in synchronization. For the FIG. 7 approach, it is desirable to use the distributed state scheme to get initially in-synchronization.

The second identified disadvantage for the Active-Protected Model was recognition that it is the most complicated design, it has limited control ability, and it has a limited ability to correct if there are problems.

The third identified disadvantage for the Active-Protected Model was that it assumes the state of the system is deterministic based on the receipt of signals. However, this problem appears to be solved in the present model of FIG. 7 by the fact that there is a single sequential path between a line blade and the control blades.

The fourth identified disadvantage for the Active-Protected Model resulted because the method also requires that the system be able to synchronize itself while running. However, this is always an issue, irrespective of the model used. If the system loses synchronization, it has to get back in synchronization using the Distributed State Model technique. This would also be true in the current Hybrid Model.

The fifth identified disadvantage for the Active-Protected Model resulted because, during a switchover, it is possible for the managers and agents to become out of synchronization due to the loss of signals. The present model of FIG. 7 resolves this disadvantage by queuing at the standby control blade any messages that may have been sent by the active control blade within the window of time required for the standby control blade to detect a failure and begin forwarding its own messages. When a failure is detected the messages in the queue are transmitted prior to any other messages transmitted by the new active control blade. This eliminates the possibility that messages queued on the active control blade destined to the line blades are lost during failover detection and failover.

The sixth identified disadvantage for the Active-Protected Model was that the loss of signals between line blades and control blades can cause a loss of synchronization between the active and standby control blades. This problem is mitigated now because of the single point of entry of messages into the control blade software. It is assumed that messages from line blades are independent of one another and their relative ordering can be fairly arbitrary.

The seventh identified disadvantage for the Active-Protected Model was that several managers are state machines driven by timers, and these timers cannot be synchronized between control blades, so the state of Rapid Spanning Tree Protocol (RSTP) will never be the same on both control blades. This is an issue with all the models (or solutions). In some cases, RSTP/LACP can become synchronized over time because their state-passing protocol is designed to be resilient enough to message failure. In other cases, the distributed state model or the passive state model will be needed in order to truly synchronize them. If the partners exchange state messages, an LACP protocol instance coming up on a standby after the active is already running will synchronize to the same state as the active by viewing the state messages of the partner. In essence, the active control blade sends its current state to the standby instance via the LACP partner. RSTP exchanges periodic messages in a similar manner. IGMP is something of an issue and requires implementation of the Distributed State Model approach to get in synchronization. The state is relatively easy to capture since there are very few state machines in the IGMP snooping protocol relative to LACP/RSTP.

The eighth identified disadvantage for the Active-Protected Model was that it is impossible to verify that the states are synchronized unless all traffic to the control blades are stopped. However, the validation of the sequence and content of messages being transmitted to the line blades is an excellent heuristic of state synchronization.

The ninth identified disadvantage for the Active-Protected Model was that there is no mechanism to verify that the line blade states are in synchronization with the control blades and there is no mechanism to clean up entries. However, synchronization can be validated by comparing messages.

The tenth identified disadvantage for the Active-Protected Model was that memory leaks will typically be reflected on both control blades since they are running in parallel, and this means that the approach does not protect against software failures. Memory leaks should be detected in advance and/or monitored dynamically by the health monitor. This presents a valid concern that an active-protected approach provides minimal protection against software defects. The primary design goal in a redundancy scheme has been primarily to design against hardware failures.

The Modified Active-Protected Model can be further modified to include a closed loop. This modification requires that there is a connection from line blades to both control blades. Since connection loss is a potential failure mode, it cannot be guaranteed.

Control blade synchronization is required for several reasons when implementing the above-described models via the network switch assembly 10 of FIG. 1.

4. Synchronization of Control Blades

Synchronization of control blades is required for the following reasons:

1. In a single blade system, if the control blade failed and rebooted, the line blades are still running. It is necessary for the control blade to recreate its state from the line blades.

2. Active Control Blade Failure: The main reason is a failure of the active control blade. This failure can be detected by the standby blade by attaching to the main processes running on the active control blade. When the active control blade fails, it may or may not lose connectivity with the line blades. If the standby takes over, the redundancy manager sends a signal to all the line blades to queue the signals to the control blade and make the standby the active control blade. All regular traffic is halted while the standby blade synchronizes.

3. Control Blade Software upgrade. During a software upgrade, the standby control blade gets the newer version of software and reboots. At this time it is completely out of synchronization with the active control blade. It is possible to synchronize the managers from the line blades. However, it may take longer or require additional effort to synchronize the protocols.

In multi-bladed redundant systems with a standby control blade, it is necessary to use the synchronization mechanism to bring the control blades into synchronization with one another so that they can run in protected mode.

In a single blade system, if the control blade reboots, the line blades continue to run. Signals are queued to the control in anticipation of the connection being re-established. If the queue becomes full, then the signals are dropped on a FIFO basis.

When the control blade comes up it will resynchronize itself with the line blades; however, protocols such as RSTP and LACP will be starting from scratch. However, line blades are still switching packets based on their previous RSTP/LACP port configuration.

At this point these managers should have a mechanism to synchronize themselves.

FIG. 8 illustrates by way of example one method for rendering control entity redundancy in a network switching device. As shown in FIG. 8, a logic flow diagram illustrates the steps of implementing control entity redundancy.

In Step S1, a network switching device is provided including a first control entity in an active state, a second control entity in a standby state, and at least one line blade communicating with the first and second control entities. The line blade has a plurality of data ports interconnected by way of switching fabric. After performing Step S1, the process proceeds to Step S2.

In Step S2, the system detects an operating state of the active control entity. After performing Step S2, the process proceeds to Step S3.

In Step S3, the system generates at least one parameter indicative of the detected operating state of the active control entity. In one case, a single parameter is generated. In other cases, multiple parameters are generated. After performing Step S3, the process proceeds to Step S4.

In Step S4, the process transfers the at least one parameter from the active control entity to the standby control entity. After performing Step S4, the process proceeds to Step S5.

In Step S5, the process synchronizes the state of the active control entity with the state of the standby control entity using the at least one parameter. In one case, a single parameter is used. In other cases, multiple parameters are used. After performing Step S5, the process proceeds to Step S6.

In Step S6, the process detects failure of an active control entity. In one case, failure is determined by detecting an error. In other cases, failure is detected when the active control entity no longer functions properly. After performing Step S6, the process proceeds to Step S7.

In Step S7, the process converts the standby control entity into the status of a new active control entity. After performing Step S7, the conversion process is complete and the overall process returns to Step S1 in order to further implement control entity redundancy.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claims:

1. A network switch assembly, comprising:
a first control entity selectively configurable between an active state and a standby state;
a second control entity selectively configurable between a standby state and an active state;
at least one line blade communicating with at least one of the first control entity and the second control entity and having at least one port configurable to enable switching of information;
wherein one of the control entities is configured as an active control entity, another of the control entities is configured as a standby control entity, and the active control entity is configured to transfer state information for the active control entity that is forwarded to the standby control; and wherein:
the first control entity comprises processing circuitry, the second control entity comprises processing circuitry, and the processing circuitry from the active control entity communicates with the processing circuitry from the standby control entity and is configured to transfer a state of the active control entity to the standby control entity;
the processing circuitry of the first control entity is configured to synchronize the states of the first control entity and the second control entity;
the first control entity and the second control entity each comprise a redundancy manager and the processing circuitry is configured to synchronize state information between the respective control entities;
the processing circuitry is configured to detect a loss of communication between the respective redundancy managers, and the switch assembly configures the another control entity as the active control entity and reboots the another control entity; and
in response to the switch assembly configuring the another control entity as the active control entity, the another control entity sends a de-queue signal to the line blade.

2. The network switch assembly of claim 1 wherein the active control entity is configured to transfer state information for the active control entity directly to the standby control entity.

3. The network switch assembly of claim 1 wherein the active control entity is configured to transfer state information for the active control entity via one of the at least one line blade to the standby control entity.

4. The network switch assembly of claim 1 wherein the first control entity and the second control entity each comprises a control blade.

5. The network switch assembly of claim 4 wherein a system state comprising the state of the active control entity is transferred to the standby control entity.

6. The network switch assembly of claim 4 wherein at least one message is configured to record and transfer the state of the active control entity.

7. The network switch assembly of claim 1 wherein the line blade comprises a plurality of Ethernet ports, and the network switch assembly comprises an Ethernet switch assembly.

8. The network switch assembly of claim 1 wherein the active control entity comprises a database configured to store a state of the active control entity in database format.

9. The network switch assembly of claim 1 wherein each of the processing circuitry is provided by a processor, and wherein both processors are configured with substantially identical hardware configurations and run substantially identical versions of software such that identical inputs to both processors will produce identical states in both processors.

10. The network switch assembly of claim 1 wherein the processing circuitry is further configured to synchronize protocol states between the respective control entities.

11. The network switch assembly of claim 1 wherein, in response to bootup of a switch assembly, the processing circuitry is configured to synchronize state information between the first control entity and the second control entity.

12. The network switch assembly of claim 1 wherein, in response to the switch assembly running under direction of the one control entity, upon insertion of the another control entity, the another control entity is configured to synchronize with the one control entity.

13. The network switch assembly of claim 1 wherein, in response to occurrence of a communication failure between the one control entity and the another control entity, the processing circuitry is configured to detect a loss of communication between the respective control entities.

14. The network switch assembly of claim 1 wherein, in response to the line blade receiving the de-queue signal, the line blade is configured to resend all signals that are not acknowledged to the another control entity, and de-queue all the queued signals.

15. A network switching device, comprising:
a pair of control entities each having processing circuitry, each control entity selectively configurable between an active state and a standby state in an alternating manner such that one control entity is configured in an active state while another control entity is configured in a standby state;
at least one line blade communicating with the first control entity and the second control entity and having a switching agent and a redundancy agent;
wherein the processing circuitry from the first control entity communicates with processing circuitry from the second control entity, one of the control entities is configured as an active control entity and another of the control entities is configured as a standby control entity, and one of the processing circuitry is configured to transfer a state of the active control entity to the standby control entity; and
wherein:
one of the at least one line blade is configured to generate and send a message to the active control entity;
in response to receiving the message at the active control entity, the active control entity is configured to copy the message and forward the copy of the message to the standby control entity;
in response to receiving the message at the standby control entity, the standby control entity is configured to generate and send an acknowledgment message to the active control entity;
each of the control entities comprises a switching manager and a redundancy manager, and wherein, in response to the active control entity receiving the acknowledgment message, the active control entity is configured to forward the acknowledgment message to the line blade that originated the message; and
each line blade comprises a redundancy agent, at least one switching agent, and a transmit queue, and wherein the redundancy agent, in response to receiving the acknowledgment message, is configured to remove the acknowledgment message from the transmit queue of the one line blade, so as to enable sending of another message to the active control entity.

16. The network switching device of claim 15 wherein the first control entity communicates via the line blade with processing circuitry from the second control entity.

17. The network switching device of claim 15 further comprising switching fabric, and wherein the line blade comprises a plurality of data ports interconnected with the switching fabric to enable data traffic switching between the data ports.

18. The network switching device of claim 15 wherein each of the control entities comprises a switching manager and a redundancy manager, and wherein the active control entity is configured to forward the message to the switching manager of the standby control entity in response to receiving the message.

19. The network switching device of claim 18 wherein the redundancy manager of the active control entity is configured to forward the processed message to the switching manager of the active control entity once the acknowledgment has been received by the standby control entity.

20. The network switching device of claim 15 wherein the line blade is configured to send a message to the active control blade in response to the line blade receiving acknowledgment of receipt of a previous message sent by the line blade to the active control blade.

21. A method for rendering control entity redundancy in a network switching device, the method comprising:
providing a network switching device including a first control entity in an active state, a second control entity in a standby state, and at least one line blade communicating with the first and second control entities and having a plurality of data ports interconnected via switching fabric;
detecting an operating state of the active control entity;
generating at least one parameter indicative of the detected operating state;
transferring the at least one parameter from the active control entity to the standby control entity;
from a line blade, generating a message indicative of state of the line blade and forwarding the message to one of the control entities that appears to be in an active state;
receiving the message at the one control entity and forwarding the message to another of the control entity that appears to be on standby;
generating an acknowledgment message at the another control entity and forwarding the acknowledgment message to the one control entity;
receiving the acknowledgment message at the one control entity and forwarding the acknowledgment message to the line blade; and
receiving the acknowledgment message at the line blade and, in response to receiving the acknowledgment message, removing the message from a transmit queue of the line blade.

22. The method of claim 21 further comprising generating an operating signal from the at least one line blade and transmitting the operating signal to an active one of the first control entity and the second control entity.

23. The method of claim 22 wherein each line blade comprises at least one switching agent and a redundancy agent, and further comprising providing the operating signal via the switching agent to the redundancy agent, copying the operating signal, and forwarding the operating signal and the copy of the operating signal via the redundancy agent to the active control entity and the standby control entity, respectively.

24. The method of claim 21 wherein each control entity comprises at least one switching manager and a redundancy manager, and further comprising synchronizing the state of the active control entity with the state of the standby control entity.

25. The method of claim 24 further comprising, following synchronizing the state of the active control entity with the state of the standby control entity, generating an input message from the line blade for receipt at the active control entity.

26. The method of claim 24 wherein synchronizing the state comprises synchronizing data tables within managers of the active control entity and the standby control entity.

27. The method of claim 24 wherein synchronizing the state comprises synchronizing protocol states with managers of the active control entity and the standby control entity.

28. The method of claim 21 wherein transferring the at least one parameter comprises periodically sending an updated state from the active control entity to the standby control entity.

29. The method of claim 28 wherein each of the at least one line blade comprises an agent communicating with the active control entity, and further comprising periodically sending an update state from the active control entity to the standby control entity.

30. The method of claim 28 further comprising duplicating signal application program interface calls to a database manager of the active control entity, and wherein transferring comprises sending the duplicated signal application program interface calls to a database manager of the standby control entity.

31. The method of claim 21 wherein transferring the at least one parameter comprises, from a line blade, receiving an operating signal from the active control entity, duplicating the operating signal, and transferring the operating signal to the active control entity and the standby control entity.

32. The method of claim 21 wherein transferring comprises generating a message indicative of operating state of the active control entity, replicating the message, and forwarding the message to the active control entity and the replicated message to the standby control entity.

33. The method of claim 21 further comprising storing state on each of the line blades, sending a signal to the active control entity indicative of the state, and wherein transferring comprises sending the signal from the active control entity to the standby control entity.

34. The method of claim 33 wherein, in response to failure of the active control entity, further comprising queuing any incoming signals via an agent on each of the line blades.

35. The method of claim 34 wherein, further in response to failure of the active control entity, further comprising converting the standby control entity into a new active control entity.

36. The method of claim 35 wherein, after converting, sending a synchronization request from the new active control entity to each of the line blades.

37. The method of claim 36 further comprising receiving the synchronization request at one of the line blades and sending state data from the one line blade to the new active control entity.

38. The method of claim 21 further comprising synchronizing state of the active control entity with state of the standby control entity using one or more of the at least one parameter.

39. The method of claim 38 further comprising detecting failure of the active control entity.

40. The method of claim 39 further comprising converting the standby control entity into a new active control entity.

41. A network switching device, comprising:
first control means for configuring the switching device and selectively configurable between an active state and a standby state;
second control means for configuring the switching device and selectively configurable between a standby state and an active state;
line blade means for enabling switching of information between ports and communicating with at least one of the first control entity and the second control entity;
wherein one of the first control means and the second control means is configured as an active control entity, another of the first control means and the second control means is configured as a standby control entity, and the active control entity is configured to transfer state information for the active control entity that is forwarded to the standby control entity; and
wherein:
the first control means comprises processing means, the second control means comprises processing means, and the processing means from the active control entity communicates with the processing means from the standby control entity and is configured to transfer a state of the active control entity to the standby control entity;
the processing means of the first control means is configured to synchronize the states of the first control means and the second control means;
the first control means and the second control means each comprise redundancy means and the processing means is configured to synchronize state information between the respective control means;
the processing means is configured to detect a loss of communication between the respective redundancy means, and the network switching device configures the another control means as the active control entity and reboots the another control means; and
in response to the switch assembly configuring the another control means as the active control entity, the another control means sends a de-queue signal to the line blade means.

42. The network switching device of claim 41 further comprising database means configured to store a state of the active control entity in a database format.

43. The network switching device of claim 41 wherein the first control means and the second control means each further comprise switching means for managing switching between ports of at least one line blade means.

44. The network switching device of claim 43 wherein the first control means and the second control means each further comprise redundancy means for managing redundancy of state for line blade means recorded in the first control means and the second control means, respectively.

45. The network switching device of claim 44 further comprising acknowledgment means for acknowledging the transfer of state information to the standby control entity.

46. The network switching device of claim 41 wherein the first and second control means each comprise a control blade, and the line blade means comprises at least one line blade.

* * * * *

UNITED STATES PATENT AND TRADEMARK OFFICE
CERTIFICATE OF CORRECTION

PATENT NO. : 7,304,940 B2 Page 1 of 1
APPLICATION NO. : 10/236548
DATED : December 4, 2007
INVENTOR(S) : Loren Douglas Larsen et al.

It is certified that error appears in the above-identified patent and that said Letters Patent is hereby corrected as shown below:

Column 16, claim 1, line 3
Please replace "standby control; and"
With -- standby control entity; and --

Signed and Sealed this

Sixth Day of May, 2008

JON W. DUDAS
*Director of the United States Patent and Trademark Office*